Dec. 27, 1966 M. C. BANCA ETAL 3,293,915

RADIOMETER CONTROL MEANS

Filed Aug. 5, 1963

INVENTORS
MAGGIO C. BANCA
NELSON E. ENGBORG
DONALD W. FISHER

BY Joseph Levinson
ATTORNEY

United States Patent Office 3,293,915

Patented Dec. 27, 1966

3,293,915

RADIOMETER CONTROL MEANS

Maggio C. Banca and Nelson E. Engborg, Old Greenwich, and Donald W. Fisher, Norwalk, Conn., assignors to Barnes Engineering Company, Stamford, Conn., a corporation of Delaware Filed Aug. 5, 1963, Ser. No. 299,842

2 Claims. (Cl. 73—355)

This invention relates to radiometer control means, and more particularly to radiometer circuitry for offsetting electrical signals produced therefrom which are to be recorded or otherwise utilized.

In Patent No. 2,963,910 by R. W. Astheimer is disclosed apparatus for offsetting or reducing in size electrical signals which are generated in radiometers in response to radiation emitted from objects whose temperatures are to be measured. These signals may be recorded in the form of thermograms, using a thermograph such as shown and described in Patent No. 2,895,049, or may be utilized with other types of recorders, meters, or other utilization means. The teachings of Patent 2,963,910 allow the display of small variations in the incoming signal, i.e., the display of small temperature variations of the other object whose temperature is being measured, which might otherwise be lost because of not being sufficient in amplitude to appear on the display.

The electrical signal offsetting apparatus of the aforesaid patent includes an attenuator which controls the gain or sensitivity of the radiometer. The attenuator allows for the study of large differences in temperature or small ones, in which the temperature differences which are indicated are quantitatively the same but the contrasts are quite different. It also includes a variable offset means, which enables the operator to set the middle of the attenuator range to correspond to the average temperature of the object being studied, thereby allowing small temperature variations to be recorded. Offsetting is shown to take place before or at the input to the amplification system. Accordingly, each time the attenuator is adjusted, the offset means must be adjusted. This interaction is undesirable for many applications such as the making of thermograms for medical diagnosis.

Accordingly, it is an object of this invention to provide an improved radiometer control means for substantially reducing or eliminating interaction between the attenuator of a radiometer and its offset means.

In carrying out this invention, the amplification system of a radiometer has an attenuator and a variable offset means, with the attenuator being connected in the amplifying system prior to the variable offset means, so that signals are first processed by the attenuator before being acted on by the variable offset means. In a more specific form, the attenuator is directly followed by the variable offset means with the circuit parameters of the attenuator and the variable offset means being proportioned to provide substantially no interaction therebetween.

Figure 1:
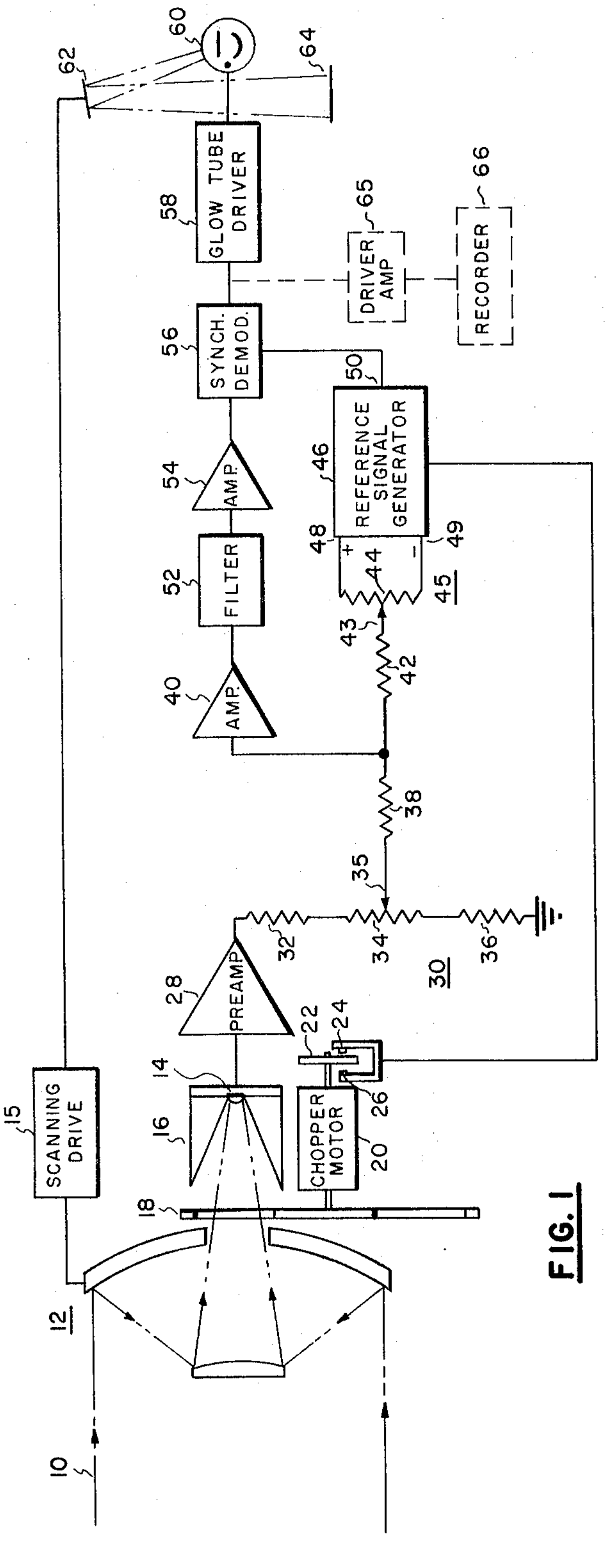
Figure 2:
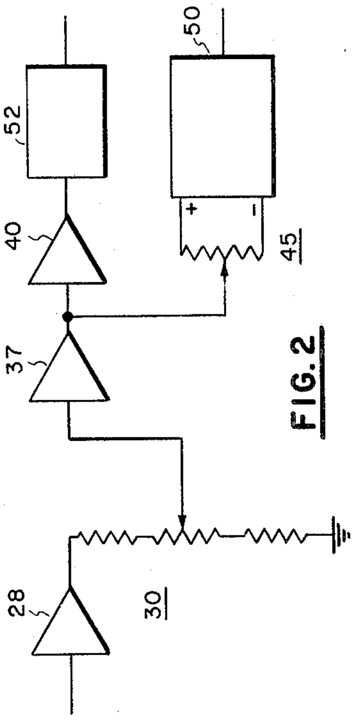

The invention, both as to organization and method of operation, together with further objects and advantages thereof, may best be understood by reference to the following description taken in connection with the accompanying drawings in which:

FIG. 1 is a schematic diagram partly in block form, showing one embodiment of this invention, and FIG. 2 is a partial showing of the schematic of FIG. 1 illustrating another embodiment of this invention.

Referring now to FIG. 1, incoming radiation 10 strikes an optical system generally indicated at 12, which functions to focus such radiation on a radiation detector 14, such as a thermistor bolometer, when it is not interrupted by a rotating chopping disc 18. The detector 14 is located at the apex of a conical shaped cavity of a known reference source 16. The conical shaped cavity of the reference source 16 is coated with absorbing material, such as black paint, and behaves as an ideal black body, such that if its temperature is known, the irradiation therefrom is also known. The chopping disc 18, which is utilized to periodically interrupt the incident radiation, may be constructed to have two opposite 90° segments removed, which are separated by mirrored surfaces. Thus, the detector 14 periodically sees incoming radiation through the openings in the disc 18, and then sees radiation emitted from the reference source 16 which is reflected from the mirrored surface of the chopping blade 18 to the detector 14. If a thermistor bolometer 14 is utilized as the radiation detector, changes of infrared radiation impinging on the detector which corresponds to changes of temperature of the object being measured, produce a corresponding change in resistance in the thermistor bolometer 14. The change in resistance results in the generation of a varying direct current voltage signal, whose amplitude is proportional to the difference in temperature of the object whose temperature is being measured and that of the reference source 16. By knowing the temperature of the reference source 16, the temperature of the object may readily be determined. This may be accomplished by controlling the ambient temperature, controlling the temperature of the reference source 16 by any suitable means such as a thermostat, or by using a calibration means such as that shown and described in U.S. Patent No. 3,283,148, issued November 1, 1966 to Schwarz and Banca, the latter being a joint inventor of the present application. The present invention may be utilized with any of the aforesaid approaches in determining the absolute temperature of the objects whose temperature is being measured.

The signals generated from the radiation detector 14 are amplified in a preamplifier 28, attenuated by an attenuator 30, and are further amplified in an amplifier 40. The attenuator 30 comprises serially connected resistors 32, 34 and 36, which are connected between the preamplifier 28 and ground. The resistor 34 is provided with a variable tap 35 which couples the resistor 34 via a resistor 38 to the input of the amplifier 40. The attenuator 30 functions to control the gain of the amplifying channel which includes amplifiers 28, 40, and a filter 52 and amplifier 54. Other stages of amplification can be provided in the amplifier channel if so desired. Since the attenuator 30 controls the range of amplitude of the signals which will be passed by the amplifying channel, it thus determines the range of temperatures which can be measured by the radiometer.

In order to be able to display small changes in temperature of the object, a variable offset means 45 is provided. The variable offset means 45 includes a source of A.C. potential from a reference signal generator 46 which exists between terminals 48 and 49, and a resistor 44 having a variable tap 43 thereon which is coupled via a resistor 42 to the input of amplifier 40. The variable offset means 45 is designed to offset the average value of the signal passed in the amplifier channel to a small value, thus making variations from the detector 14 a relatively large percentage of the average signal, which, in effect, allows the recording of small amplitude variations corresponding to small temperature changes of the object or the field of view of the instrument. By connecting resistor 44 between terminals 48 and 49 which are not grounded, a smooth control of either positive or negative polarity of pulse of correct phase around the average offset is obtained. It should be noted that unlike the aforesaid Patent No. 2,963,910, the variable offset means 45 is connected in the amplifier channel after or subsequent to the attenuator 30. The ratio of resistor 38 to resistor 34 is made large, as is the ratio of resistor 42 to resistor 44, so that substantially no interaction results between the attenuator 30 and the variable offset means 45. The larger these ratios the less interaction occurs. A ratio, for example, of 50–1 results in interaction in the amplifying channel signal of less than 1%.

The signal from the thermistor bolometer 14, after being amplified by the peramplifier 28 and acted upon by the attenuator 30 and the variable offset means 45, is applied via a filter 52 to an amplifier 54, and then to a synchronous demodulator 56. It is desirable to apply the offset signal before the filter to eliminate high frequency components resulting from the mixing of the offset signal with the detector signal.

On method of providing synchronizing pulses to obtain synchonous demodulation in the demodulator 56, resides in providing a disc 22 on the shaft of the chopper blade 18, which is driven by the chopper motor 20. The construction of the chopper blade 22 is similar to that of the chopper blade 18. A light 24 is positioned on one side of the blade, and a photoelectric cell 26 is placed on the other side such that a signal is generated when the open segments of the chopper disc 22 appear, which, of course, are in synchronism with the open segments of the chopper disc 18, thus producing an electrical pulse which is fed to a reference generator 46 which generates a signal in synchronism with the signal developed by the radiation detector 14. Any other form for generating such pulses, such as a magnetic arrangement, could be utilized.

The output of the synchronous demodulator 56 is a direct current signal whose amplitude is proportional to the difference between the signal produced by the radiation from the object and the signal produced by the radiation from the reference source 16. This signal may be applied to a glow tube driver 58, and then to a glow tube 60, which varies the brightness of the glow tube in accordance with the amplitude of the signal applied thereto. The light output of the glow tube 60 is reflected by a mirror 62 onto a film 64 for recording. A scanning drive 15 of the type shown and described in Patent No. 2,895,049 may be provided for scanning the optical system over a field of view, and at the same time scanning the mirror 62 in synchronism therewith over the film 64 for providing a thermogram of the object whose temperature is to be measured, or the field of view thereof. Alternatively, the output of the synchronous detector could be applied to a driver amplifier 65, and therefrom to a recorder 66. The recorder 66 may include a recorder stylus whose movement may be recorded on a paper chart, and the movement thereof will be proportional to the amplitude of the direct current signal applied from the driver amplifier 65. The showing of the recorder 66 is merely indicative of the fact that the invention is not restricted to use for thermographs, but may be utilized with any form of utilization means which provides an indication or a display of the temperatures of the objects whose temperature is to be measured.

In FIG. 2 an arrangement is shown in which the attenuator 30 is completely isolated from the variable offset means 45 by an amplifier 37 having unity gain. In this configuration, no interaction takes place between the attenuator 30 and the variable offset means 45. The same result could also be achieved by connecting the variable offset means to the output of the amplifier 40 instead of the input as shown in FIG. 1. Of course, with such a connection, a higher offset voltage would be required, and the benefit of amplification through amplifier 40 is not available. The circuit of FIG. 1 offers the advantage of being able to apply a smaller offset voltage, which is amplified in amplifier 40, requiring no additional amplifiers, or no increase in offset voltage. The advantage in having less amplifier stages over having to provide a larger offset voltage will normally outweigh the disadvantage of the small interaction that takes place when connecting the attenuator 30 and the variable offset means 45 to the input of the same amplifier stage.

Although not restricted thereto, the present invention may be particularly useful in thermographs of the type disclosed in Patent No. 2,895,049. When thermographs of this type are used for taking thermal images for medical diagnosis, it is highly desirable to utilize an offset signal in order to be able to record all changes in temperature of the patient whose thermal picture is being taken. Interacting controls on the thermograph would tend to obscure the results and make it necessary for a highly skilled operator to operate the device. Non-interacting controls will allow the operator to be less skilled, and to concentrate his attention on other factors to produce a better thermogram of the patient.

If a small temperature range is to be recorded which is always greater or less than the prevailing ambient temperature range, the system need not be phase sensitive, and synchronous demodulation is not absolutely necessary, although in most instances it might be considered preferable. In such a case the variable offset voltage which would be a direct current signal would be applied after detection in the signal channel. The attenuator would still be connected before detection so that no interaction would result.

The non-interacting features of this invention have been accomplished without the use of additional components or parts. Since the offset is not applied to the preamplifier as in Patent No. 2,963,910, the preamplifier 28 must have a dynamic range capable of handling the entire signal developed by the detector 14. But for many uses, such as the restricted range required for making thermograms for medical diagnosis, this is not a serious disadvantage, and is greatly outweighed by the advantage of having non-interacting controls for providing a better and more accurate thermogram.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A radiometer for measuring the temperature of objects by infrared radiation emitted therefrom comprising (a) a reference source of infrared radiation, (b) an infrared detector for producing electrical signals in accordance with the infrared radiation impinging thereon, (c) optical means for focusing infrared radiation from objects whose temperature is to be measured on said infrared detector, (d) chopper means for alternately directing radiation from said objects and from said reference source to said detector, (e) an amplifier channel connected to said detector for amplifying said electrical signals from said infrared detector, (f) a demodulator means for detecting said electrical signals from said amplifier, (g) utilization means, (h) means for connecting the electrical signals from said demodulator to said utilization means, (i) attenuator means comprising a first variable resistor having a tap thereon connected to a first resistor which is substantially larger in magnitude than said first variable resistor, (j) a variable offset signal means comprising a source of potential having a second variable resistor connected across said source, said second variable resistor having a tap thereon connected to a second resistor which is substantially larger in magnitude than said second variable resistor, and (k) means for connecting said variable offset signal means subsequent to said attenuator means in said amplifying channel with said first and second resistors being connected to a common point in said amplifying channel for substantially reducing interaction between said attenuator means and said variable offset signal means.

2. In a radiometer for measuring the temperature of objects by the emitted infrared radiation therefrom, (a) a reference source of infrared radiation, (b) an infrared detector for producing an electrical signal in accordance with the infrared radiation impinging thereon, (c) chopper means for alternately directing radiation from the objects and from the reference source of said detector, (d) a reference signal generator synchronized with said chopper means for producing a varying signal synchronized with the signal developed by said detector and an alternating current reference source, (e) processing circuitry connected to said detector which includes amplifying means and a synchronous detector means which has applied thereto the varying signal developed from said reference signal generator, (f) an attenuator comprising a first variable resistor having a tap thereon connected to a first resistor which is substantially larger in magnitude than said first variable resistor, (g) variable offset means comprising a second variable resistor connected across said alternating current reference source having a tap thereon connected to a second resistor which is substantially larger in magnitude than said second variable resistor, and (h) means for connecting said attenuator before said variable offset means in said processing circuitry with said first and second resistor connected to a common point in said processing circuitry for substantially reducing interaction between said attenuator and said variable offset means.

References Cited by the Examiner

UNITED STATES PATENTS

| | | | |
|---|---|---|---|
| 2,835,856 | 5/1958 | Moseley | 346—32 X |
| 2,889,503 | 6/1959 | Chambers | 346—32 X |
| 2,963,910 | 12/1960 | Astheimer | 73—355 |
| 3,029,336 | 4/1962 | Ferrar | 346—32 X |

LOUIS R. PRINCE, *Primary Examiner.*

STEVEN H. BAZERMAN, *Assistant Examiner.*